United States Patent
Shibata (10) Patent No.: US 7,928,715 B2
(45) Date of Patent: Apr. 19, 2011

(54) SWITCHING REGULATOR

(75) Inventor: Kimio Shibata, Austin, TX (US)

(73) Assignee: Seiko Instruments Inc., Chiba (JP)

( * ) Notice: Subject to any disclaimer, the term of this patent is extended or adjusted under 35 U.S.C. 154(b) by 155 days.

(21) Appl. No.: 12/371,391

(22) Filed: Feb. 13, 2009

(65) Prior Publication Data

US 2009/0261797 A1   Oct. 22, 2009

Related U.S. Application Data

(60) Provisional application No. 61/046,992, filed on Apr. 22, 2008.

(51) Int. Cl.
*H02J 3/12* (2006.01)

(52) U.S. Cl. ......................... 323/288; 323/284; 323/901

(58) Field of Classification Search .................. 323/238, 323/242, 288, 234, 235, 282, 321, 311, 312
See application file for complete search history.

(56) References Cited

U.S. PATENT DOCUMENTS

| | | | | |
|---|---|---|---|---|
| 6,954,056 | B2 * | 10/2005 | Hoshino et al. | 323/285 |
| 7,719,249 | B2 * | 5/2010 | Matyas et al. | 323/285 |
| 2009/0278521 | A1 * | 11/2009 | Omi et al. | 323/288 |
| 2010/0052640 | A1 * | 3/2010 | Ryoo | 323/288 |

FOREIGN PATENT DOCUMENTS

JP     2007-159316 A    6/2007

* cited by examiner

*Primary Examiner* — Gary L. Laxton
*Assistant Examiner* — Nguyen Tran
(74) *Attorney, Agent, or Firm* — Brinks Hofer Gilson & Lione (57) ABSTRACT

Provided is a switching regulator which is capable of reducing soft start time when being activated, and prolonging battery life. The switching regulator has a configuration in which a clamp circuit for clamping a reference voltage is provided in a soft start circuit, and a predetermined period of time since the switching regulator has been activated is divided into a plurality of segments to increase the reference voltage with different slopes for each of the plurality of segments. At an early stage of the activation, the reference voltage is set to be low for preventing an inrush current from a power source, and thereafter, a rate of increase in reference voltage is gradually increased, to thereby reduce the soft start time.

4 Claims, 5 Drawing Sheets

SWITCHING REGULATOR

REFERENCE TO RELATED APPLICATION

This application claims the benefit of U.S. Provisional Application No. 61/046,992, filed Apr. 22, 2008, the entirety of which is hereby incorporated by reference.

BACKGROUND OF THE INVENTION

1. Field of the Invention

The present invention relates to a switching regulator which is frequently used as a power supply circuit, and particularly, to a start-up circuit of the switching regulator.

2. Description of the Related Art

Figure 5:
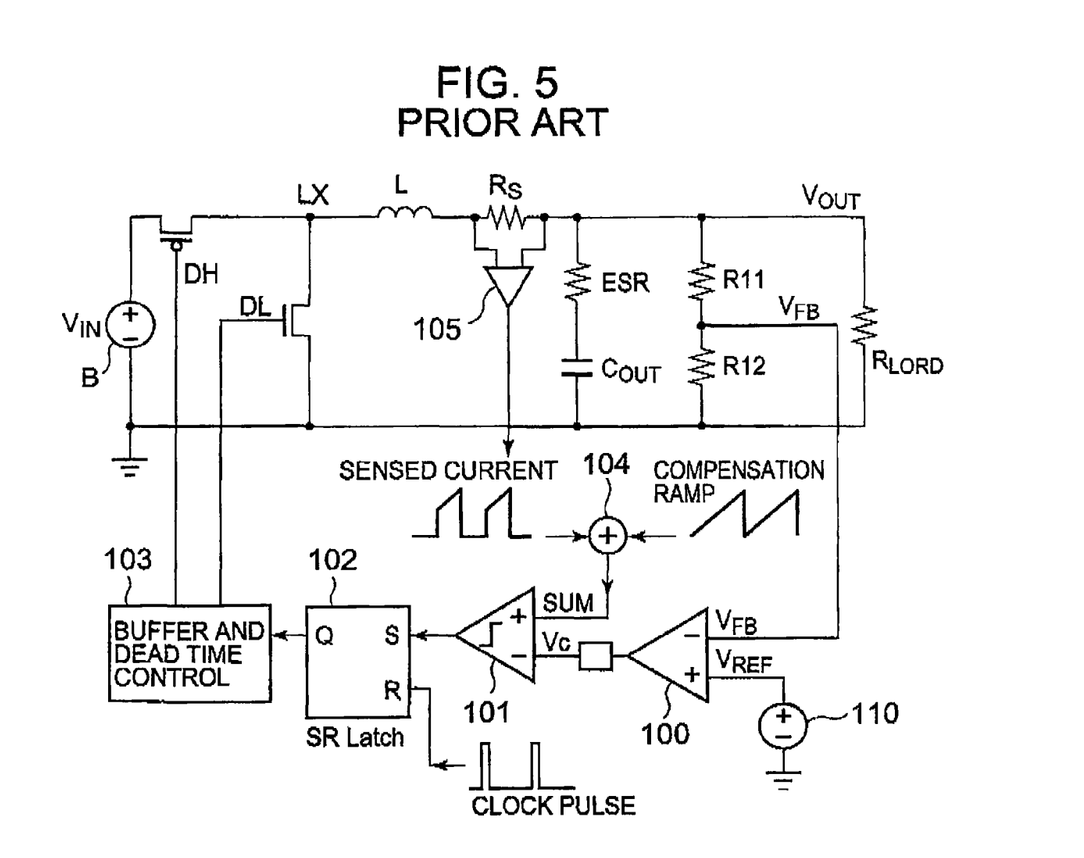
FIG. 5 is a block diagram illustrating a configuration of a conventional switching regulator.

As illustrated in FIG. 5, a switching regulator includes: an error amplifier circuit (error amplifier) 100 for comparing a divided voltage VFB obtained by dividing an output voltage Vout by a resistor R11 and a resistor R12 with a reference voltage VREF output from a reference voltage source 110; an amplifier 105 for converting a coil current flowing through a coil L into a voltage with the use of a resistor Rs; an adder 104 for outputting a signal SUM obtained by adding a voltage value which is obtained by converting the coil current into a voltage and a voltage value of a reference triangular wave signal; a PWM comparator (modulator) 101 for comparing a voltage value of an output signal Vc of the error amplifier circuit 100 with a voltage value of the signal SUM output from the adder 104 to generate a pulse signal of a duty cycle, which is in accordance with a comparison result; and a buffer circuit 103.

Switching control is performed on a p-channel type MOS transistor DH and an n-type MOS transistor DL which serve as a switching element in response to an output signal of the PWM comparator 101, and electrical energy stored in the coil L is adjusted (charging of the coil L is controlled), whereby the output voltage Vout is controlled to be constant at a predetermined set value.

In a current-mode switching regulator which is used for outputting a constant voltage, an output voltage of the error amplifier circuit 100 is slowly increased over a certain period of time in order to reduce an inrush current from a primary power source (battery) and an overshoot of the output voltage. This period of time is referred to as soft start time, and is generally set between several mS to 10 mS.

As described above, the output voltage of the error amplifier circuit 100 corresponds to an input signal which is input to one input terminal of the PWM comparator 101, which controls the switching transistor, via a soft start circuit 500. In addition, a signal obtained by converting the switching current of the coil L into a voltage by a predetermined amplification degree is input to the other input terminal of the PWM comparator 101.

Figure 6:
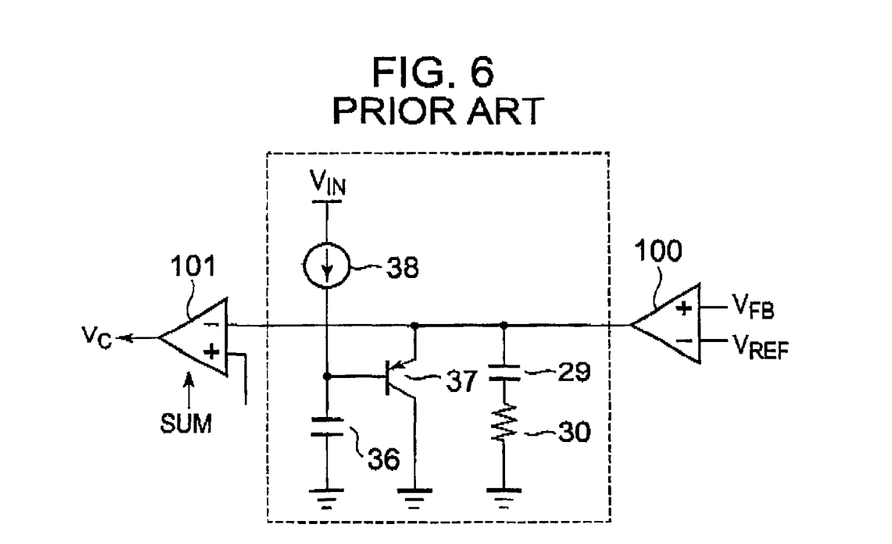
FIG. 6 is a conceptual diagram for describing a configuration of a soft start circuit of the conventional switching regulator.

As illustrated in FIG. 6, in the soft start circuit 500, a voltage Vin is input from a battery to thereby charge a capacitor 36, and a PNP bipolar transistor 37 becomes an off-state from an on-state to gradually increase the output voltage of the error amplifier. As a result, the switching current of the coil L increases in proportion to an increase of the output voltage, with the result that the output voltage Vout of the switching regulator is gradually increased.

In this manner, generally, the output voltage is increased from 0 V in a state of a light load for activating the switching regulator. In this case, in order to suppress the inrush current and reduce a burden placed on an input side of the power source such as a battery, a soft start circuit for gradually increasing the output voltage of the switching regulator is frequently used. The soft start circuit is realized by, in the PWM comparator, gradually increasing the voltage of the output signal of the error amplifier circuit, which is the voltage to be compared with the reference triangular wave signal, as described above. Specifically, as the soft start circuit 500, in many cases, the capacitor is charged with a constant current so that a voltage which gradually increases is generated to be output to the error amplifier circuit, whereby a soft start function is realized (for example, see JP 2007-159316 A).

However, in the above-mentioned conventional soft start circuit 500 used in the switching regulator, the output voltage Vout is changed with a constant slope within the predetermined soft start time, and hence it takes time before the output voltage Vout becomes constant.

On this occasion, when rise time in which the output voltage Vout increases to the predetermined voltage, that is, the soft start time is simply reduced, the inrush current from the primary power source and the overshoot of the output voltage may not be reduced.

Further, in a portable electronic device, the switching regulator has, as its function, a standby mode for stopping an operation of a stabilized power source in order to prolong life of a battery mounted thereon.

Unnecessary current is not consumed in high-speed switching from the standby mode to an operation mode in which the stabilized power source is operated, and hence there can be obtained a great power-saving effect in enabling the frequent operation in the standby mode.

SUMMARY OF THE INVENTION

The present invention has been made in view of the above-mentioned circumstances, and therefore, it is an object of the present invention to provide a switching regulator which is capable of, compared with a switching regulator of a conventional case, reducing soft start time and unnecessary consumption current of the primary power source mounted on a portable electronic device, and prolonging life of the primary power source while reducing an inrush current from a primary power source and an overshoot of an output voltage.

The present invention provides a switching regulator for converting an input voltage, which is input to an input terminal thereof, into a predetermined constant voltage and outputting the predetermined constant voltage as an output voltage from an output terminal thereof, including: a switching element; a coil which is charged with the input voltage through switching of the switching element; a switch circuit for switching the switching element; another coil which is charged with the input voltage through the switching of the switching circuit; an error amplifier for amplifying a voltage difference between the output voltage and a reference voltage and outputting an error signal; a soft start circuit for, when the switching regulator is activated, making a ramp voltage to be output a voltage value of the error signal in a predetermined period of time; a triangular wave generator for generating a triangular wave; and a control circuit unit for comparing the ramp voltage with a voltage of the triangular wave, and outputting a pulse signal indicating a result of the comparing to the switch circuit to perform switching control on the switching circuit, in which, when the switching regulator is activated, the soft start circuit increases the reference voltage to a predetermined voltage value for the predetermined period of time, and the predetermined period of time is divided into a plurality of segments to increase the ramp voltage at slopes which are different for each of the plurality of segments.

In the switching regulator according to the present invention: when the switching regulator is activated, the soft start circuit increases the reference voltage at a predetermined angle; the soft start circuit includes, as constant current power sources for which different thresholds are set, a plurality of constant current power sources for feeding a constant current when a voltage input thereto exceeds a threshold; and when the reference voltage increases to exceed thresholds of a larger number of the plurality of constant current power sources, and thus the larger number of the plurality of constant current power sources operate, the soft start circuit adds current values of the operating constant current power sources and converts the added current values into a voltage value to generate the slopes which are different for each of the plurality of segments within the predetermined period of time.

In the switching regulator according to the present invention, when the switching regulator is activated, the soft start circuit starts charging a first capacitor with a current of a constant current power source for reference voltage to gradually increase the reference voltage.

In the switching regulator according to the present invention: the plurality of constant current power sources each include a switching element connected in series therewith, and a comparator corresponding thereto; the comparator includes one input terminal input with a voltage having a threshold which is different among the comparators of the plurality of constant current power sources, and another input terminal input with the reference voltage; and when the reference voltage exceeds the threshold, the comparator outputs an on-signal to the switching element corresponding to the comparator, and the corresponding constant current power source outputs a current.

In the switching regulator according to the present invention, when output currents of the plurality of constant current power sources are added and are charged into a second capacitor, the ramp voltage is generated.

According to the present invention, as described above, an increase in ramp voltage within the soft start time of the error amplifier circuit (error amplifier) is changed at a slope dv/dt of the error amplifier circuit for each of the plurality of segments obtained by dividing the soft start time into the plurality of segments. Specifically, the ramp voltage is increased with a lapse of time, and the reference voltage is ramped up so that the soft start time is made substantially constant from a current of a light load to a current of the maximum load. Accordingly, the soft start time can be made shorter compared with the conventional switching regulator.

That is, in the present invention, the reference voltage is ramped up, and hence the reference voltage is still smaller than the final output voltage of the switching regulator (constant voltage value in a normal operation after the switching regulator is activated) even when the ramp voltage of the error amplifier increases. Accordingly, the voltage value of the output voltage is suppressed to prevent the overshoot.

DETAILED DESCRIPTION OF THE PREFERRED EMBODIMENT

Figure 1:
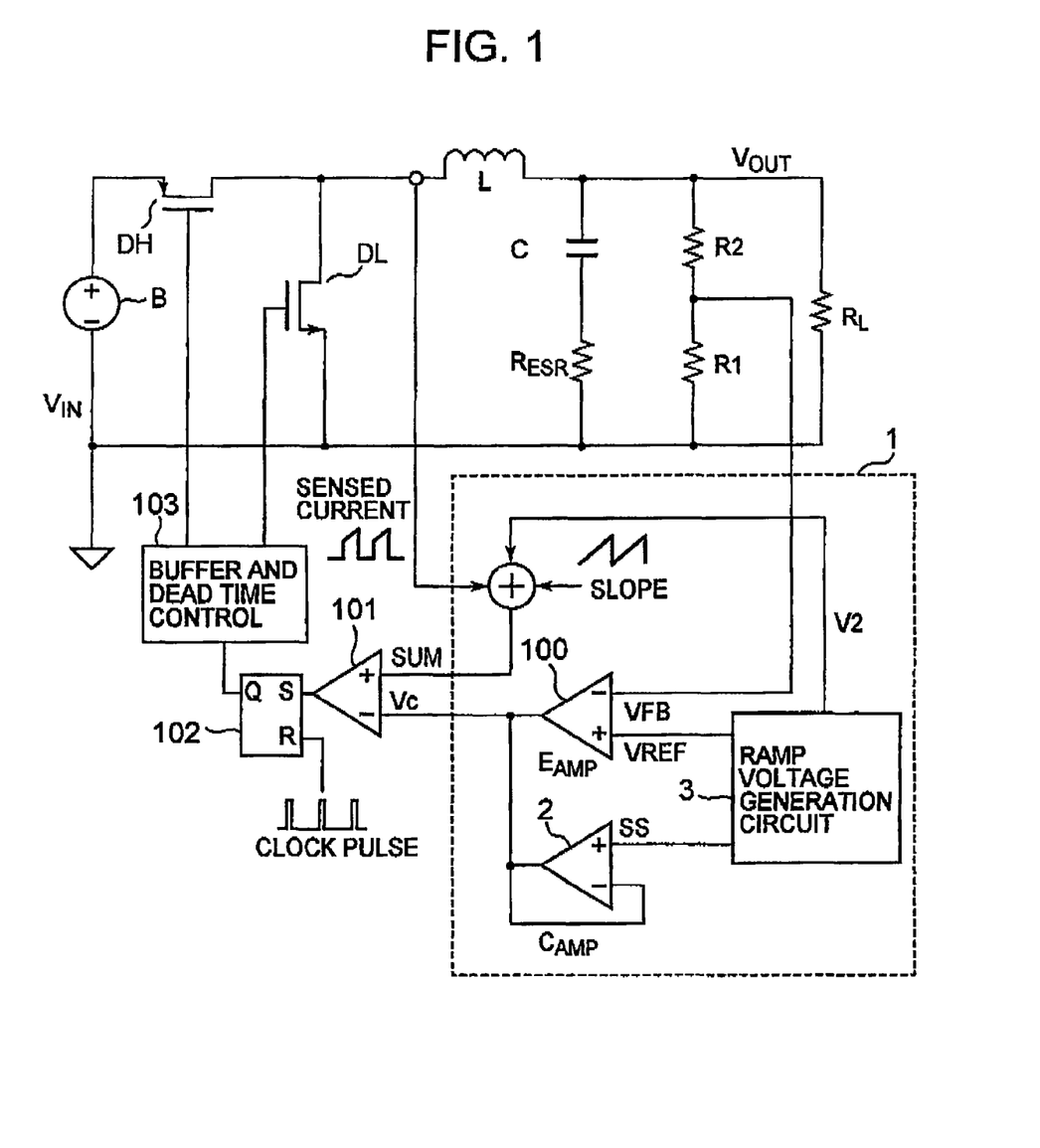
FIG. 1 is a block diagram illustrating a configuration example of a switching regulator according to an embodiment of the present invention.

Hereinafter, a switching regulator according to an embodiment of the present invention is described with reference to the drawings. FIG. 1 illustrates a configuration example of a ramp voltage generator and a control circuit of the switching regulator according to this embodiment. Note that components similar to those of a conventional case illustrated in FIG. 5 are denoted by the same reference symbols, and their descriptions are omitted.

In this embodiment, a soft start unit 1 including a ramp voltage generation circuit 3, a clamp amplifier 2, and an error amplifier 100 is provided as a configuration different from that of the conventional case.

The ramp voltage generation circuit 3 outputs a reference voltage VREF and a soft start signal SS. The reference voltage VREF increases to a normal voltage at a rate of increase (dVREF/dt) which is the same as that of the conventional switching regulator in a period of time which is shorter than soft start time of the conventional switching regulator. The soft start signal SS has a voltage for clamping an increase of the reference voltage VREF. The soft start signal SS does not have a constant rate of increase during the soft start time, and divides the soft start time into a plurality of periods, for example, into four periods to change a rate of increase (dV/dt) in each of the periods. In other words, the rate of increase in voltage value of the soft start signal SS is gradually increased in the later period in which more time elapses.

The error amplifier 100 receives a divided voltage VFB and the reference voltage VREF, and outputs a voltage Vc to be input to an inverting input terminal of a PWM comparator 101.

The clamp amplifier 2 clamps the voltage Vc in accordance with an increase in voltage value of the soft start signal SS to be input.

Figure 2:
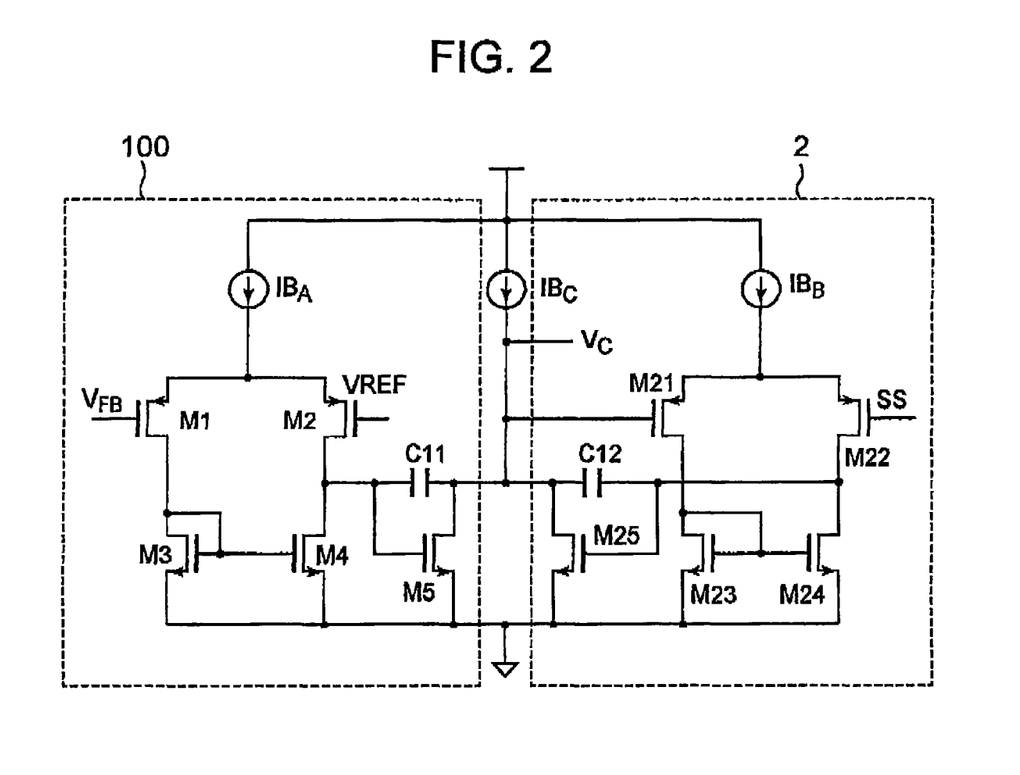
FIG. 2 is a circuit diagram illustrating a configuration example of an error amplifier and a clamp amplifier of FIG. 1.

FIG. 2 is a circuit diagram illustrating a configuration example of the error amplifier 100 and the clamp amplifier 2.

The divided voltage VFB when the switching regulator is activated is lower than the reference voltage VREF, and thus a MOS transistor 5 is in an off-state, and the voltage Vc has a voltage value of the soft start signal SS, which is output from the clamp amplifier 2. Then, when the divided voltage VFB is equal to the reference voltage VREF, the MOS transistor M5 is turned on. Here, an output load circuit IBc is shared between the error amplifier 100 and the clamp amplifier 2. As a result, a MOS transistor M25 is turned off, and the voltage Vc is controlled by the output voltage of the error amplifier 100.

Accordingly, at the time when the switching regulator is activated, the soft start unit 1 outputs, to the inverting input terminal of the PWM comparator 101, the voltage Vc in which the rate of increase (dV/dt) in voltage value gradually increases with a lapse of time.

Therefore, the output voltage of the switching regulator can be limited to be low and the inrush current, the overshoot, or the like can be suppressed in the first period, and the rate of increase in soft start signal SS is gradually increased each time a period elapses, to thereby reduce the soft start time.

Figure 3:
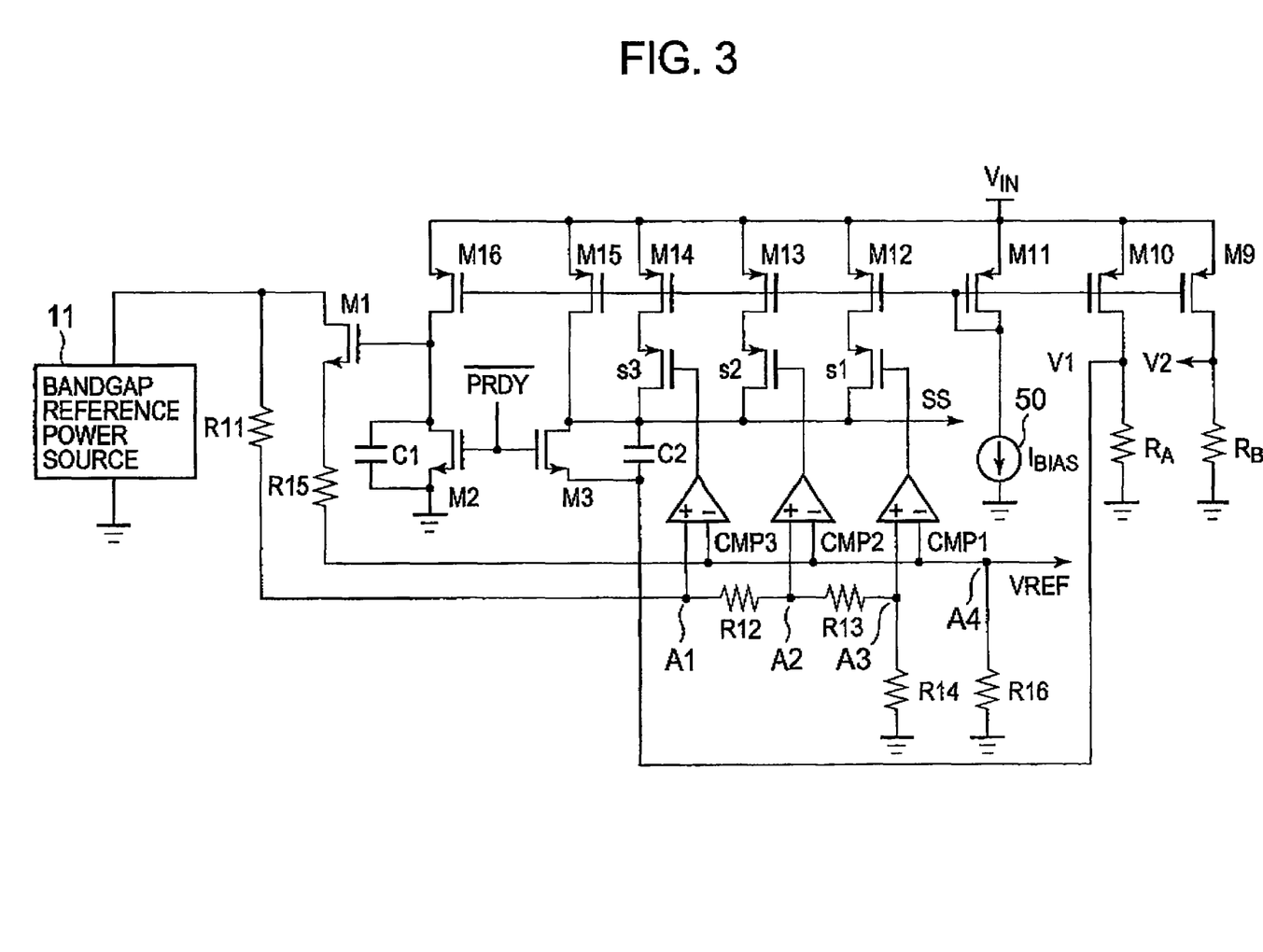
FIG. 3 is a circuit diagram illustrating a configuration example of a ramp voltage generation circuit of FIG. 1.

Next, with reference to FIG. 3, the ramp voltage generation circuit 3 according to this embodiment is described. FIG. 3 is a circuit diagram illustrating a configuration example of the ramp voltage generation circuit 3 according to this embodiment.

The ramp voltage generation circuit 3 includes a bandgap reference power source 11, p-channel type MOS transistors M9, M10, M11, M12, M13, M14, M15, M16, s1, s2, and s3, n-channel type MOS transistors M1, M2, and M3, comparators CMP1, CMP2, and CMP3, capacitors C1 and C2, resistors R11, R12, R13, R14, R15, R16, RA, and RB, and a constant current source 50.

Sources of the MOS transistors M9, M10, M11, M12, M13, M14, M15, and M16 are connected to a positive terminal of a battery B which is a primary power source, and are applied with an output voltage Vin of the battery B. A drain of the MOS transistor M11 is grounded via the constant current source 50. A negative terminal of the battery B is grounded.

Gates of the MOS transistors M9, M10, M11, M12, M13, M14, M15, and M16 are connected to the drain of the MOS transistor M11. In other words, the MOS transistors M9, M10, M12, M13, M14, M15, and M16, and the MOS transistor M11 forms a current mirror, and a constant current corresponding to a current flowing through the MOS transistor M11 flows through the MOS transistors M9, M10, M12, M13, M14, M15, and M16.

A drain of the MOS transistor M10 is connected to the resistor RA, and a voltage V1 is output from a connection point between the drain thereof and the resistor RA. A drain of the MOS transistor M9 is connected to the resistor RB, and a voltage V2 is output from a connection point between the drain thereof and the resistor RB.

A drain of the MOS transistor M15 is connected to a drain of the MOS transistor M3. In the MOS transistor M3, a gate thereof is applied with a control signal PRDY which is output from, for example, a UVLO (not shown), and a source thereof is applied with the voltage V1.

A drain of the MOS transistor M14 is connected to a source of the MOS transistor s3.

In the MOS transistor s3, a gate thereof is connected to an output terminal of the comparator CMP3, and a drain thereof is connected to one terminal of the capacitor C2. The other terminal of the capacitor C2 is connected to the source of the MOS transistor M3.

A drain of the MOS transistor M13 is connected to a source of the MOS transistor s2.

In the MOS transistor s2, a gate thereof is connected to an output terminal of the comparator CMP2, and a drain thereof is connected to the one terminal of the capacitor C2.

A drain of the MOS transistor M12 is connected to a source of the MOS transistor s1.

In the MOS transistor s1, a gate thereof is connected to an output terminal of the comparator CMP1, and a drain thereof is connected to the one terminal of the capacitor C2.

The source of the MOS transistor M16 is connected to a drain of the MOS transistor M2.

In the MOS transistor M2, the drain thereof is connected to one terminal of the capacitor C1, a gate thereof is applied with the control signal PRDY, and a source thereof is grounded. The other terminal of the capacitor C1 is grounded.

The resistors R11 to R14 are connected in series between a positive terminal of the bandgap reference power source 11 and a ground point.

Specifically, in the bandgap reference power source 11, the positive terminal thereof is connected to one terminal of the resistor R11, and a negative terminal thereof is grounded.

The other terminal of the resistor R11 is connected to one terminal of the resistor R12 at a connection point A1. The other terminal of the resistor R12 is connected to one terminal of the resistor R13 at a connection point A2. The other terminal of the resistor R13 is connected to one terminal of the resistor R14 at a connection point A3. The other terminal of the resistor R14 is grounded. Accordingly, there are generated a first threshold Vt1 (at the connection point A3), a second threshold Vt2 (at the connection point A2), and a third threshold Vt3 (at the connection point A1) corresponding to the comparators CMP1, CMP2, and CMP3, respectively.

In the MOS transistor M1, a drain thereof is connected to the positive terminal of the bandgap reference power source 11, a gate thereof is connected to the one terminal of the capacitor C1, and a source thereof is connected to one terminal of the resistor R15. In the resistor R15, the other terminal thereof is connected to one terminal of the resistor R16 at a connection point A4. The other terminal of the resistor R16 is grounded.

In the comparator CMP3, an inverting input terminal (negative) thereof is connected to the connection point A4, and a non-inverting input terminal (positive) thereof is connected to the connection point A1.

In the comparator CMP2, an inverting input terminal (negative) thereof is connected to the connection point A4, and a non-inverting input terminal (positive) thereof is connected to the connection point A2.

In the comparator CMP1, an inverting input terminal (negative) thereof is connected to the connection point A4, and a non-inverting input terminal (positive) thereof is connected to the connection point A3.

Figure 4:
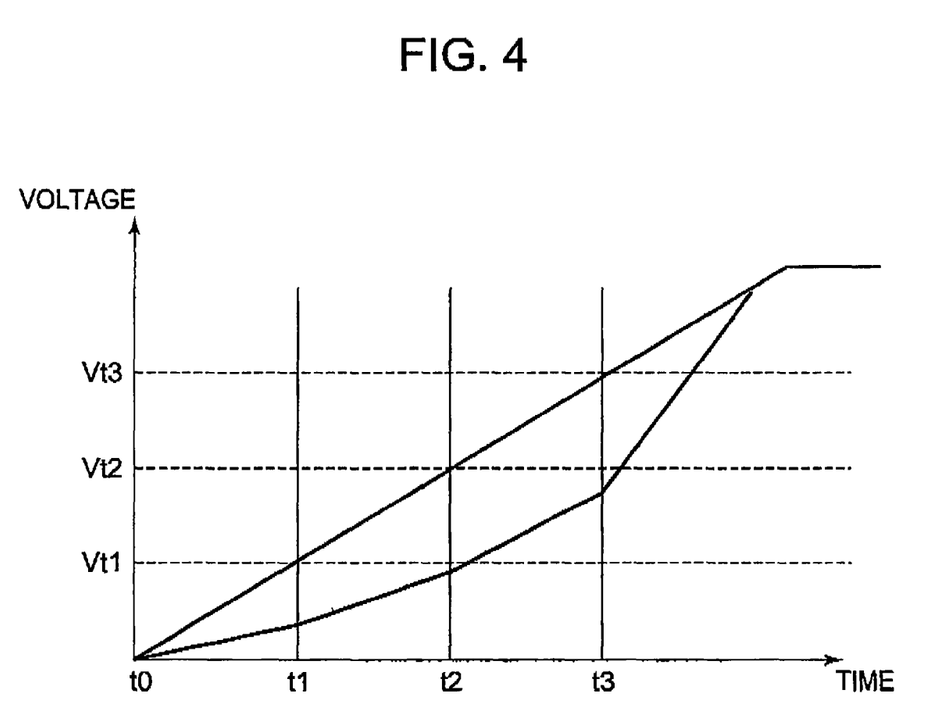
FIG. 4 is a waveform diagram for describing an operation example of a soft start unit of FIG. 1.

Next, with reference to FIG. 1 to FIG. 4, an operation of the switching regulator of FIG. 1 is described. FIG. 4 is a waveform diagram for describing an operation example of the soft start unit 1 of the switching regulator of FIG. 1.

When the switching regulator is activated, the control signal PRDY changes from an "H" level to an "L" level.

As a result, the MOS transistor M2 and the MOS transistor M3 becomes an off-state from an on-state, whereby charging is started for the capacitor C1 by a constant current flowing through the MOS transistor M16, and charging is started for the capacitor C2 with a constant current flowing through the MOS transistor M15 (at a time t0).

On this occasion, in the comparators CMP3, CMP2, and CMP1, voltages input to the non-inverting input terminals thereof are higher than voltages input to the inverting input terminals thereof, whereby signals of the "H" level are output from the output terminals thereof. In addition, the MOS transistors s1, s2, and s3 are all in the off-state, and hence, the capacitor C2 is charged only with the constant current flowing through the MOS transistor M15, as described above.

At the time t0 when the control signal PRDY changes from the "H" level to the "L" level, the reference voltage VREF and the soft start signal SS are both 0 V.

On this occasion, the voltage value of the soft start signal SS is charged only by the MOS transistor M15, and a rate of increase in voltage thereof is $\alpha 1$.

Then, at a time t1, when the reference voltage VREF exceeds the first threshold voltage Vt1 (voltage value at the connection point A3), a voltage value of the inverting input terminal exceeds a voltage value of the non-inverting input terminal, and thus an output of the comparator CMP1 changes from the "H" level to the "L" level.

Accordingly, the MOS transistor s1 becomes the on-state, and the capacitor C2 is charged with a current value obtained by adding the constant current flowing through the MOS transistor M15 and the constant current flowing through the MOS transistor M12.

As a result, the voltage value of the soft start signal SS is charged by the MOS transistors M15 and M12, and a rate of increase in voltage thereof changes into α2 (>α1).

Then, at a time t2, when the reference voltage VREF exceeds the second threshold voltage Vt2 (voltage value at the connection point A2), the voltage value of the inverting input terminal exceeds the voltage value of the non-inverting input terminal, whereby an output of the comparator CMP2 changes from the "H" level to the "L" level.

Accordingly, the MOS transistor s2 becomes the on-state, and the capacitor C2 is charged with a current value obtained by adding the constant current flowing through the MOS transistor M15, the constant current flowing through the MOS transistor M12, and the constant current flowing through the MOS transistor M13.

As a result, the voltage value of the soft start signal SS is charged by the MOS transistors M15, M12, and M13, and hence the rate of increase in voltage changes into α3 (>α2>α1).

At a time t3, when the reference voltage VREF exceeds the third threshold voltage Vt3 (voltage value at the connection point A1), the voltage value of the inverting input terminal exceeds the voltage value of the non-inverting input terminal, whereby an output of the comparator CMP3 changes from the "H" level to the "L" level.

Accordingly, the MOS transistor s3 becomes the on-state, and the capacitor C2 is charged with a current value obtained by adding the constant current flowing through the MOS transistor M15, the constant current flowing through the MOS transistor M12, the constant current flowing through the MOS transistor M13, and the constant current flowing through the MOS transistor M14.

As a result, the voltage value of the soft start signal SS is charged by the MOS transistors M15, M12, M13, and M14, whereby the rate of increase in voltage changes into α4 (>α3>α2>α1).

As described above, when the switching regulator is activated, the voltage Vc has the voltage value of the soft start signal SS output from the clamp amplifier 2. Then, each time the reference voltage VREF exceeds a threshold for changing a rate of increase in voltage value, a rate of increase in voltage value of the soft start signal SS increases. When the divided voltage VFB is equal to the reference voltage VREF, the voltage Vc becomes the voltage output from the error amplifier circuit 100 and is input to the inverting input terminal of the PWM comparator 101.

As can be seen from the above, in this embodiment, the voltage Vc is controlled to be sufficiently low at the first stage of the soft start, and hence the inrush current from the primary power source and the overshoot of the output voltage can be reduced. Moreover, the rate of increase in voltage Vc is increased at the stage in which the inrush current and the overshoot of the output voltage do not occur, with the result that the soft start time can be reduced compared with the conventional case. Accordingly, it is possible to reduce an unnecessary consumption current of the primary power source mounted on the portable electronic device and to prolong life of the primary power source. In addition, even when the thresholds for the comparators CMP1 to CMP3 vary due to variations of the elements, and the voltage value of the soft start signal SS increases earlier than the set soft start time, the reference voltage VREF is increased at the set rate of increase during the soft start time. For this reason, it is possible to suppress the output voltage, and the inrush current from the primary power source and the overshoot of the output voltage can be reduced.

What is claimed is:

1. A switching regulator for converting an input voltage, which is input to an input terminal thereof, into a predetermined constant voltage and outputting the predetermined constant voltage as an output voltage from an output terminal thereof, comprising:
   a switching element;
   a coil which is charged with the input voltage through switching of the switching element;
   a switch circuit for switching the switching element;
   the coil which is charged with the input voltage through the switching of the switching circuit;
   an error amplifier for amplifying a voltage difference between the output voltage and a reference voltage and outputting an error signal;
   a soft start circuit for, when the switching regulator is activated, clamping the error signal by a ramp voltage to be output and causing the ramp voltage to have a voltage value of the error signal in a predetermined period of time;
   a triangular wave generator for generating a triangular wave; and
   a control circuit unit for comparing the ramp voltage with a voltage of the triangular wave, and outputting a pulse signal indicating a result of the comparing to the switch circuit to perform switching control on the switching circuit,
   wherein, when the switching regulator is activated, the soft start circuit increases the reference voltage at a predetermined angle and to a predetermined voltage value for the predetermined period of time, and the predetermined period of time comprises a plurality of segments to increase the ramp voltage at slopes which are different for each of the plurality of segments;
   the soft start circuit includes, as constant current power sources for which different thresholds are set, a plurality of constant current power sources for feeding a constant current when a voltage input thereto exceeds a threshold; and
   when the reference voltage increases to exceed thresholds of a larger number of the plurality of constant current power sources, and thus the larger number of the plurality of constant current power sources operate, the soft start circuit adds current values of the operating constant current power sources and converts the added current values into a voltage value to generate the slopes which are different for each of the plurality of segments within the predetermined period of time.

2. A switching regulator according to claim 1, wherein, when the switching regulator is activated, the soft start circuit starts charging a first capacitor with a current of a constant current power source for reference voltage to gradually increase the reference voltage.

3. A switching regulator according to claim 2, wherein:
   the plurality of constant current power sources each include:
     a switching element connected in series therewith; and
     a comparator corresponding thereto;
   the comparator comprises one input terminal input with a voltage having a threshold which is different among the comparators of the plurality of constant current power sources, and another input terminal input with the reference voltage; and
   when the reference voltage exceeds the threshold, the comparator outputs an on-signal to the switching element corresponding to the comparator, and the corresponding constant current power source outputs a current.

4. A switching regulator according to claim 1, wherein, when output currents of the plurality of constant current power sources are added and are charged into a second capacitor, the ramp voltage is generated.

* * * * *